United States Patent
Shah et al.

(10) Patent No.: US 9,591,724 B2
(45) Date of Patent: *Mar. 7, 2017

(54) MANAGING SSL FIXTURES OVER PLC NETWORKS

(71) Applicant: Cooper Technologies Company, Houston, TX (US)

(72) Inventors: Ashok Deepak Shah, Atlanta, GA (US); David Diehl Roberts, III, Birmingham, AL (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 809 days.

This patent is subject to a terminal disclaimer.

(21) Appl. No.: 13/919,298

(22) Filed: Jun. 17, 2013

(65) Prior Publication Data
US 2013/0271038 A1    Oct. 17, 2013

Related U.S. Application Data

(63) Continuation of application No. 13/399,268, filed on Feb. 17, 2012, now Pat. No. 8,466,585, which is a
(Continued)

(51) Int. Cl.
*H05B 37/02* (2006.01)
*G05B 15/02* (2006.01)
(Continued)

(52) U.S. Cl.
CPC .......... *H05B 37/0263* (2013.01); *F21S 8/035* (2013.01); *F21V 21/096* (2013.01);
(Continued)

(58) Field of Classification Search
CPC ....................................................... H04B 3/00
(Continued)

(56) References Cited

U.S. PATENT DOCUMENTS 2,733,831 A    2/1956  Nehls
4,347,576 A    8/1982  Kensinger et al.
(Continued)

FOREIGN PATENT DOCUMENTS

CN          1464695 A       12/2003
DE      202004006292 U1      7/2004
(Continued)

OTHER PUBLICATIONS

Office action for U.S. Appl. No. 14/491,141, mailed on Dec. 3, 2015, Shah et al., "Illumination Device and Fixture", 18 pages.
(Continued)

*Primary Examiner* — Robert Deberadinis
(74) *Attorney, Agent, or Firm* — Lee & Hayes, PLLC

(57) ABSTRACT

Managing solid-state luminary (SSL) fixtures over power line carrier (PLC) networks is described herein. Devices provided in this description include SSL arrays, and converter circuitry coupled to drive the SSL arrays. More specifically, the converter circuitry is adapted to convert input voltage received from a power distribution network into a level suitable for driving the SSL arrays. The devices also include (PLC) modems for coupling to PLC networks, and coupled to the converter circuitry. In particular, the PLC modems interface the converter circuitry to the PLC networks.

14 Claims, 7 Drawing Sheets

Related U.S. Application Data continuation of application No. 12/408,503, filed on Mar. 20, 2009, now Pat. No. 8,148,854.

(60) Provisional application No. 61/038,211, filed on Mar. 20, 2008.

(51) Int. Cl.

| | | |
|---|---|---|
| *H05B 33/08* | (2006.01) | |
| *F21V 21/096* | (2006.01) | |
| *F21S 8/00* | (2006.01) | |
| *H04B 3/00* | (2006.01) | |
| *F21S 2/00* | (2016.01) | |
| *F21Y 101/00* | (2016.01) | |

(52) U.S. Cl.
CPC ......... *G05B 15/02* (2013.01); *H05B 33/0803* (2013.01); *H05B 33/0842* (2013.01); *H05B 33/0851* (2013.01); *H05B 33/0866* (2013.01); *H05B 33/0896* (2013.01); *H05B 37/0245* (2013.01); *H05B 37/0254* (2013.01); *F21K 9/23* (2016.08); *F21S 2/005* (2013.01); *F21Y 2101/00* (2013.01); *F21Y 2105/10* (2016.08); *F21Y 2115/10* (2016.08); *G05B 2219/2642* (2013.01); *Y02B 20/383* (2013.01); *Y10T 307/944* (2015.04)

(58) Field of Classification Search
USPC ....................................................... 307/140
See application file for complete search history.

(56) References Cited

U.S. PATENT DOCUMENTS

| | | |
|---|---|---|
| 4,370,723 A | 1/1983 | Huffman et al. |
| 4,556,866 A | 12/1985 | Gorecki |
| 4,663,569 A | 5/1987 | Alley et al. |
| 4,847,782 A | 7/1989 | Brown, Jr. et al. |
| 4,962,687 A | 10/1990 | Belliveau et al. |
| 5,248,919 A | 9/1993 | Hanna et al. |
| 5,291,101 A | 3/1994 | Chandrasekaran |
| 5,323,090 A | 6/1994 | Lestician |
| 5,471,119 A | 11/1995 | Ranganath et al. |
| 5,475,360 A | 12/1995 | Guidette et al. |
| 5,621,662 A | 4/1997 | Humphries et al. |
| 5,848,054 A | 12/1998 | Mosebrook et al. |
| 5,857,767 A | 1/1999 | Hochstein |
| 5,884,205 A | 3/1999 | Elmore et al. |
| 5,905,442 A | 5/1999 | Mosebrook et al. |
| 5,909,429 A | 6/1999 | Satyanarayana et al. |
| 5,982,103 A | 11/1999 | Mosebrook et al. |
| 6,016,038 A | 1/2000 | Mueller et al. |
| 6,037,721 A | 3/2000 | Lansing et al. |
| 6,040,663 A | 3/2000 | Bucks et al. |
| 6,064,695 A | 5/2000 | Raphaeli |
| 6,157,093 A | 12/2000 | Giannopoulos et al. |
| 6,166,496 A | 12/2000 | Lys et al. |
| 6,211,626 B1 | 4/2001 | Lys et al. |
| 6,226,600 B1 | 5/2001 | Rodenberg, III et al. |
| 6,234,645 B1 | 5/2001 | Borner et al. |
| 6,234,648 B1 | 5/2001 | Borner et al. |
| 6,250,774 B1 | 6/2001 | Begemann et al. |
| 6,278,245 B1 | 8/2001 | Li et al. |
| 6,285,912 B1 | 9/2001 | Ellison et al. |
| 6,292,901 B1 | 9/2001 | Lys et al. |
| 6,304,464 B1 | 10/2001 | Jacobs et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,441,723 B1 | 8/2002 | Mansfield, Jr. et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,528,594 B1 | 3/2003 | Bauer et al. |
| 6,548,967 B1 | 4/2003 | Dowling et al. |
| 6,552,495 B1 | 4/2003 | Chang |
| 6,576,881 B2 | 6/2003 | Muthu et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,614,013 B2 | 9/2003 | Pitigoi-Aron et al. |
| 6,614,204 B2 | 9/2003 | Pellegrino et al. |
| 6,621,235 B2 | 9/2003 | Chang |
| 6,630,801 B2 | 10/2003 | Schuurmans |
| 6,639,368 B2 | 10/2003 | Shoeghong |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,777,891 B2 | 8/2004 | Lys et al. |
| 6,788,011 B2 | 9/2004 | Mueller et al. |
| 6,822,555 B2 | 11/2004 | Mansfield et al. |
| 6,831,569 B2 | 12/2004 | Wang et al. |
| 6,867,558 B2 | 3/2005 | Gaus, Jr. et al. |
| 6,888,819 B1 | 5/2005 | Mushkin et al. |
| 6,897,624 B2 | 5/2005 | Lys et al. |
| 6,907,472 B2 | 6/2005 | Mushkin et al. |
| 6,933,685 B2 | 8/2005 | Gutta et al. |
| 6,937,648 B2 | 8/2005 | Raphaeli |
| 6,965,205 B2 | 11/2005 | Piepgras et al. |
| 6,967,448 B2 | 11/2005 | Morgan et al. |
| 6,975,079 B2 | 12/2005 | Lys et al. |
| 6,982,870 B2 | 1/2006 | Wu et al. |
| 6,998,594 B2 | 2/2006 | Gaines et al. |
| 7,014,336 B1 | 3/2006 | Ducharme et al. |
| 7,038,399 B2 | 5/2006 | Lys et al. |
| 7,071,762 B2 | 7/2006 | Xu et al. |
| 7,113,541 B1 | 9/2006 | Lys et al. |
| 7,132,804 B2 | 11/2006 | Lys et al. |
| 7,139,617 B1 | 11/2006 | Morgan et al. |
| 7,140,752 B2 | 11/2006 | Ashdown |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,204,622 B2 | 4/2007 | Dowling et al. |
| 7,231,060 B2 | 6/2007 | Dowling et al. |
| 7,233,115 B2 | 6/2007 | Lys |
| 7,233,515 B2 | 6/2007 | Rohr |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,256,554 B2 | 8/2007 | Lys |
| 7,262,559 B2 | 8/2007 | Tripathi et al. |
| 7,300,192 B2 | 11/2007 | Mueller et al. |
| 7,319,298 B2 | 1/2008 | Jungwirth et al. |
| 7,339,466 B2 | 3/2008 | Mansfield et al. |
| 7,353,071 B2 | 4/2008 | Blackwell et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,961 B2 | 4/2008 | Zwanenburg |
| 7,387,405 B2 | 6/2008 | Ducharme et al. |
| 7,427,927 B2 | 9/2008 | Borleske et al. |
| 7,456,588 B2 | 11/2008 | Alexandrov |
| 7,703,951 B2 | 4/2010 | Piepgras et al. |
| 7,725,629 B2 | 5/2010 | Sturm et al. |
| 7,766,518 B2 | 8/2010 | Piepgras et al. |
| 7,961,090 B2 | 6/2011 | Hu |
| 8,148,854 B2 * | 4/2012 | Shah ..................... G05B 15/02 307/140 |
| 8,195,340 B1 | 6/2012 | Haney et al. |
| 8,324,838 B2 | 12/2012 | Shah et al. |

(56) References Cited

U.S. PATENT DOCUMENTS

| | | |
|---|---|---|
| 8,466,585 B2 | 6/2013 | Shah et al. |
| 8,536,805 B2 | 9/2013 | Shah et al. |
| 8,884,549 B2 | 11/2014 | Shah et al. |
| 2002/0105432 A1 | 8/2002 | Pederson et al. |
| 2002/0161624 A1 | 10/2002 | Bradlee |
| 2003/0057886 A1 | 3/2003 | Lys et al. |
| 2004/0002792 A1 | 1/2004 | Hoffknecht |
| 2004/0137935 A1 | 7/2004 | Zarom |
| 2004/0178683 A1 | 9/2004 | Hermetz et al. |
| 2004/0259435 A1 | 12/2004 | Stephan et al. |
| 2005/0090915 A1 | 4/2005 | Geiwitz |
| 2005/0097162 A1 | 5/2005 | Budike, Jr. |
| 2005/0099319 A1 | 5/2005 | Hutchison et al. |
| 2005/0253533 A1 | 11/2005 | Lys et al. |
| 2005/0289279 A1 | 12/2005 | Fails et al. |
| 2006/0022214 A1 | 2/2006 | Morgan et al. |
| 2006/0038506 A1 | 2/2006 | Rose et al. |
| 2006/0142900 A1 | 6/2006 | Rothman et al. |
| 2006/0215345 A1 | 9/2006 | Huizenga |
| 2006/0226956 A1 | 10/2006 | Young et al. |
| 2006/0262544 A1 | 11/2006 | Piepgras et al. |
| 2007/0013557 A1 | 1/2007 | Wang et al. |
| 2007/0014113 A1 | 1/2007 | Von Der Brelie |
| 2007/0024213 A1 | 2/2007 | Shteynberg et al. |
| 2007/0131784 A1 | 6/2007 | Garozzo et al. |
| 2007/0145915 A1 | 6/2007 | Roberge et al. |
| 2007/0213879 A1 | 9/2007 | Iwamura |
| 2007/0228999 A1 | 10/2007 | Kit |
| 2007/0229295 A1 | 10/2007 | Curt et al. |
| 2007/0260405 A1 | 11/2007 | McConnell et al. |
| 2008/0052145 A1 | 2/2008 | Kaplan et al. |
| 2008/0281473 A1 | 11/2008 | Pitt |
| 2009/0062967 A1 | 3/2009 | Kressner et al. |
| 2009/0062970 A1 | 3/2009 | Forbes, Jr. et al. |
| 2009/0086487 A1 | 4/2009 | Ruud et al. |
| 2009/0088991 A1 | 4/2009 | Brezowski et al. |
| 2009/0171510 A1* | 7/2009 | Hu .................... H05B 33/0857 700/292 |
| 2009/0237011 A1 | 9/2009 | Shah et al. |
| 2009/0240380 A1 | 9/2009 | Shah et al. |
| 2010/0191388 A1 | 7/2010 | Huizenga |
| 2012/0014643 A1 | 1/2012 | Bratkovski et al. |
| 2012/0146430 A1 | 6/2012 | Shah et al. |
| 2012/0274238 A1 | 11/2012 | Shah et al. |
| 2013/0027103 A1 | 1/2013 | Leistad et al. |
| 2014/0021867 A1 | 1/2014 | Shah et al. |
| 2015/0002024 A1 | 1/2015 | Shah et al. |

FOREIGN PATENT DOCUMENTS

| | | |
|---|---|---|
| WO | WO9960804 | 11/1999 |
| WO | WO2005/101916 | 10/2005 |
| WO | WO2007003038 | 1/2007 |
| WO | WO2007104137 | 9/2007 |

OTHER PUBLICATIONS

U.S. Notice of Allowance dated May 19, 2014 in U.S. Appl. No. 14/028,014.
Chinese Official Action dated Apr. 16, 2014 in Chinese Application No. CN 200980119568.2.
Chinese Official Action dated Feb. 21, 2014 in Chinese Application No. 200980119574.8.
Chinese Official Action dated Jul. 8, 2013 in Chinese Application No. 200980119574.8.
Office Action from the U.S. Patent and Trademark Office for U.S. Appl. No. 14/491,141, mailed on Nov. 19, 2014, Shah et al., "Illumination Device and Fixture", 8 pages.
Office Action from the U.S. Patent and Trademark Office for U.S. Appl. No. 14/491,141, mailed on Apr. 3, 2015, Shah et al., "Illumination Device and Fixture", 11 pages.
Office Action from the U.S. Patent and Trademark Office for U.S. Appl. No. 14/034,037, mailed on Jul. 17, 2015, Shah et al., "Energy Management System", 22 pages.
Chinese Office Action dated Sep. 11, 2013 in Chinese Application No. CN 200980119568.2.
Office Action from the U.S. Patent and Trademark Office for U.S. Appl. No. 14/034,037, mailed Sep. 4, 2014, 18 pages.
Office Action from the U.S. Patent and Trademark Office for U.S. Appl. No. 14/491,141, 9 pages.
U.S. Official Action dated Nov. 27, 2013 in U.S. Appl. No. 14/028,014.
U.S. Official Action dated Nov. 5, 2013 in U.S. Appl. No. 14/034,037.
PCT Patent Application Serial No. PCT/US09/37859, filed Mar. 20, 2009, entitled "Managing SSL Fixtures Over PLC Networks" Inventors: Ashok Deepak Shah and David Diehl Roberts, III.
International Search Report dated Apr. 29, 2009 of the co-pending PCT Application Serial No. PCT/US09/37859 filed Mar. 20, 2009.
PCT Patent Application Serial No. PCT/US09/37866, filed Mar. 20, 2009, entitled "Energy Management System" Inventors: Ashok Deepak Shah and David Diehl Roberts, III.
International Search Report dated May 22, 2009 of the co-pending PCT Application Serial No. PCT/US09/37866 filed Mar. 20, 2009.
International Search Report dated May 27, 2009 of the co-pending PCT Application Serial No. PCT/US09/37843 filed Mar. 20, 2009.
U.S. Official Action dated Dec. 7, 2010 in U.S. Appl. No. 12/408,503.
U.S. Official Action dated Jun. 9, 2011 in U.S. Appl. No. 12/408,503.
U.S. Notice of Allowance dated Feb. 2, 2012 in U.S. Appl. No. 12/408,503.
U.S. Official Action dated Dec. 21, 2011 in U.S. Appl. No. 12/408,463.
U.S. Notice of Allowance dated May 9, 2012 in U.S. Appl. No. 12/408,463.
U.S. Official Action dated Apr. 24, 2012 in U.S. Appl. No. 12/408,499.
U.S. Official Action dated Dec. 17, 2012 in U.S. Appl. No. 12/408,499.
U.S. Official Action dated Nov. 23, 2012 in U.S. Appl. No. 12/546,366.
U.S. Notice of Allowance dated May 16, 2013 in U.S. Appl. No. 12/546,366.
U.S. Official Action dated Jul. 19, 2012 in U.S. Appl. No. 13/399,268.
U.S. Official Action dated Aug. 31, 2012 in U.S. Appl. No. 13/399,268.
U.S. Notice of Allowance dated Mar. 19, 2013 in U.S. Appl. No. 13/399,268.
Chinese Official Action dated Mar. 20, 2012 in Chinese Application No. 200980119568.2.
Chinese Official Action dated Jan. 17, 2013 in Chinese Application No. 200980119568.2.
Chinese Official Action dated Sep. 10, 2012 in Chinese Application No. 200980119574.8.
Australian Official Action dated Mar. 4, 2013 in Australian Application No. 2009225455.
Australian Official Action dated Mar. 13, 2013 in Australian Application No. 2009225460.
Bit Angle Modulation WP Howell, "An Overview of the Electronic Drive Techniques for Intensity Control and Colur Mixing of Low Voltage Light Sources Such as LEDs and LEPs," White Paper, Artistic License (UK) Ltd., May 2002, 9 pages.
Datasheet: CY8CPLC10—Powerline Communication Solution Apr. 24, 2008, Cypress Semiconductor Corporation, 11 pages.
DCSK—ASCK Overview, downloaded Mar. 20, 2009 from http://tinyurl.com/aw6hqy, 2 pages.
"Insteon: The details," Aug. 11, 2005, Smarthome Technologies, 68 pages.
"Insteon: Compared," Jan. 2, 2006, SmartLabs Technology, 69 pages.

(56) References Cited

OTHER PUBLICATIONS

"Manufacturer of Lighting Control and Automation Systems for New and Retrofit Environments," Downloaded Apr. 7, 2011 from http://www.dimonoff.com/pdf/DimOnOff_EN_Final.pdf , 27 pages.
"Wireless Distributed Lighting Control and Automation," downloaded Apr. 7, 2011 from http://www.dimonoff.com/, 1 page.
U.S. Notice of Allowance dated Jun. 25, 2013 in U.S. Appl. No. 12/408,499.
Australian Official Action dated Jul. 1, 2013 in Australian Application No. 2009225446.
Extended European Seach Report mailed Aug. 22, 2016 for European patent application No. 09722028.9, 7 pages.
Extended European Seach Report mailed Aug. 24, 2016 for European patent application No. 09722657.5, 7 pages.
Extended European Seach Report mailed Aug. 4, 2016 for European patent application No. 09722843.1, 8 pages.
Office action for U.S. Appl. No. 14/034,037, mailed on Apr. 7, 2016, Shah et al., "Energy Management System", 18 pages.

* cited by examiner

MANAGING SSL FIXTURES OVER PLC NETWORKS

CROSS-REFERENCE TO RELATED APPLICATIONS

This application is a continuation of prior U.S. patent application Ser. No. 13/399,268, now U.S. Pat. No. 8,466,585, entitled "MANAGING SSL FIXTURES OVER PLC NETWORKS" filed Feb. 17, 2012, which is a continuation of U.S. Ser. No. 12/408,503, now U.S. Pat. No. 8,148,854, entitled "MANAGING SSL FIXTURES OVER PLC NETWORKS" filed Mar. 20, 2009, which claims the benefit of U.S. Provisional Patent Application No. 61/038,211, entitled "INTELLIGENT ILLUMINATION AND ENERGY MANAGEMENT SYSTEM" filed on Mar. 20, 2008, all of which are expressly incorporated herein by reference in their entireties. This patent application is also related to U.S. patent application Ser. No. 12/408,499, entitled "ENERGY MANAGEMENT SYSTEM," filed on Mar. 20, 2009; U.S. patent application Ser. No. 12/408,464, now U.S. Pat. No. 7,726,974, filed Mar. 20, 2009 entitled "A CONDUCTIVE MAGNETIC COUPLING SYSTEM"; and U.S. patent application Ser. No. 12/408,463, now U.S. Pat. No. 8,324,838, entitled "ILLUMINATION DEVICE AND FIXTURE," filed on Mar. 20, 2009. Each of the aforementioned share the same assignee as this application. The aforementioned patent applications are expressly incorporated herein by reference in their entireties.

DETAILED DESCRIPTION

Figure 1:
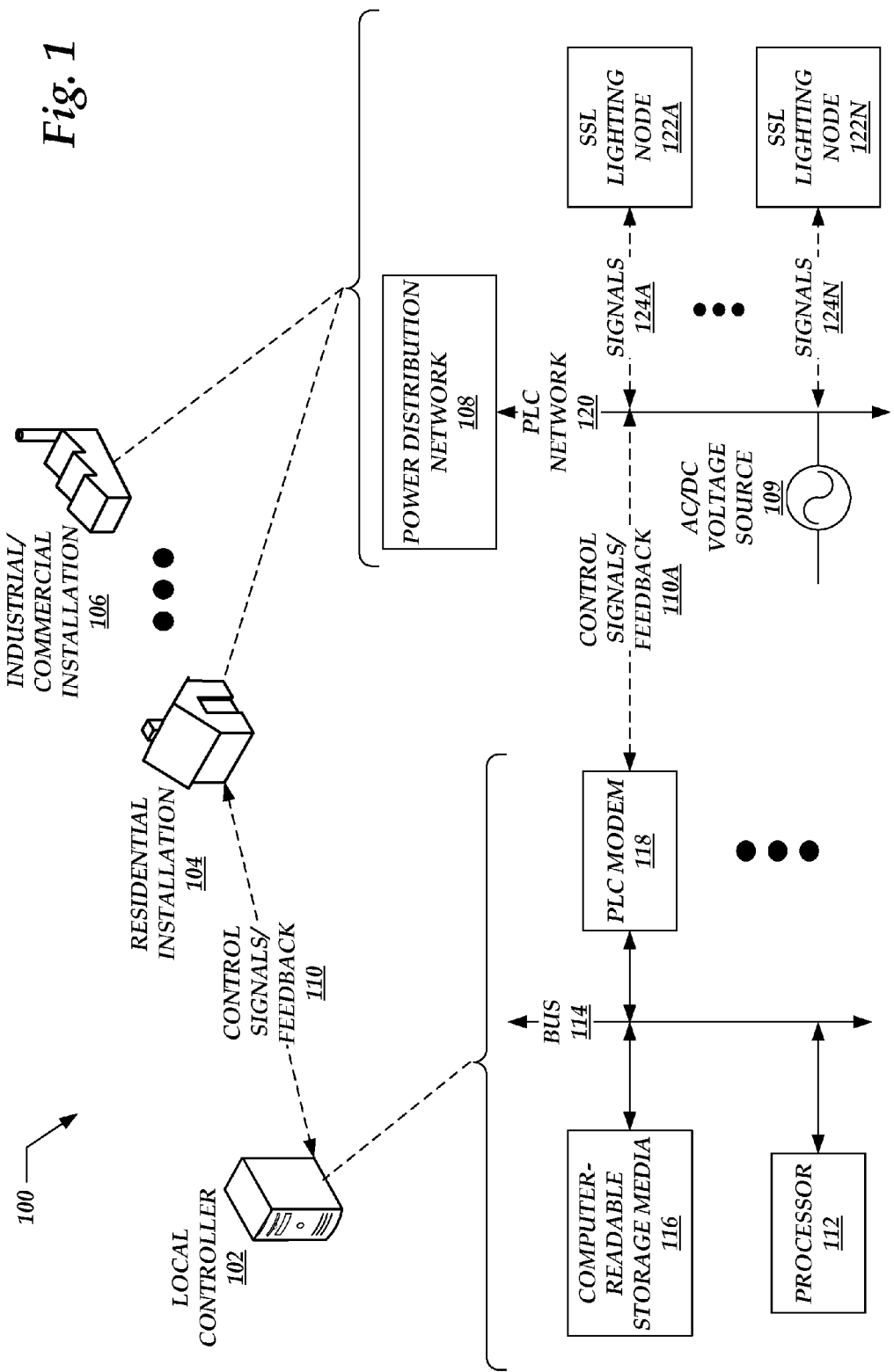
FIG. 1 is a combined block and flow diagram illustrating systems or operating environments suitable for managing solid-state luminary (SSL) fixtures over power line carrier (PLC) networks, as well as architectures for local controllers.

The following detailed description provides tools and techniques for managing solid-state luminary (SSL) fixtures over power line carrier (PLC) networks. While at least some of the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including handheld devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to managing SSL fixtures over PLC networks.

FIG. 1 illustrates systems or operating environments, denoted generally at 100, that are suitable for managing SSL fixtures over PLC networks. These systems 100 may include any number of local controllers 102, with FIG. 1 illustrating one local controller 102 only for clarity of illustration. In the example shown in FIG. 1, the local controller 102 may be deployed within residential installations, denoted generally at 104, may be deployed within industrial/commercial installations, denoted generally at 106, or may be deployed within other types of installations not shown explicitly in FIG. 1.

Turning to the residential or industrial installations 104 or 106 in more detail, these installations may include respective instances of power distribution networks or circuits 108, which distribute power within buildings or other structures that constitute the residential or industrial installations 104 or 106. These power distribution networks 108 may represent any number of discrete grids or sub-grids, and may be characterized as single-phase, poly-phase (e.g., three-phase delta, three-phase wye, etc.), or the like, depending upon the type and nature of an AC/DC voltage source 109. In addition, these power distribution networks 108 may supply and distribute voltage having any number of different voltage classes (e.g., alternating current (AC), direct current (DC), or any combination of the foregoing). The power distribution networks 108 may also supply voltage at any appropriate level, depending on the circumstances of particular implementations. The power distribution networks 108 may represent conductors and devices involved with transmitting and distributing power within at least parts of such installations.

Subsequent drawings provide additional details on example architectures and components suitable for implementing the local controllers 102. However, in overview, the local controllers 102 may transmit control signals over the power distribution networks 108 to any number of lighting fixtures deployed or installed within the residential installations 104 or industrial installations 106. These lighting fixtures are not shown in FIG. 1, but are described in further detail below in subsequent drawings. More specifically, the lighting fixtures may provide illumination using solid-state luminary (SSL) technology. In addition, the local controllers 102 may receive feedback information from the lighting fixtures. For clarity of illustration, FIG. 1 represents these control signals and feedback information collectively at 110.

Turning to the local controllers 102 in more detail, these controllers 102 may include one or more instances of processing hardware, with FIG. 1 providing a processor 112 as an example of such processing hardware. The processors 112 may have any particular type or architecture, chosen as appropriate for particular implementations. In addition, the processors 112 may couple to one or more bus systems 114, having type and/or architecture that is chosen for compatibility with the processors 112.

The local controllers 102 may include one or more instances of a physical computer-readable storage medium or media 116, which couple to the bus systems 114. The bus systems 114 may enable the processors 112 to read code and/or data to/from the computer-readable storage media 116. The media 116 may represent an apparatus in the form of storage elements that are implemented using any suitable technology, including but not limited to semiconductors, magnetic materials, optics, or the like. The media 116 may represent memory components, whether characterized as RAM, ROM, flash, or other types of technology. The media 116 may also represent secondary storage, whether implemented as hard drives, CD-ROMs, DVDs, or the like. Hard drive implementations may be characterized as solid state, or may include rotating media storing magnetically-encoded information.

The storage media 116 may include one or more modules of software instructions that, when loaded into the processor 112 and executed, cause the local controllers 102 to participate in managing SSL fixtures over PLC networks. As detailed throughout this description, these modules of instructions may also provide various tools or techniques by which the local controllers 102 may manage SSL fixtures over PLC networks using the components, flows, and data structures discussed in more detail throughout this description.

In general, the software modules for managing SSL fixtures over PLC networks may, when loaded into the processors 112 and executed, transform the processors 112 and the overall local controllers 102 from general-purpose computing systems into special-purpose computing systems customized for managing SSL fixtures over PLC networks. The processors 112 may be constructed from any number of transistors or other discrete circuit elements, which may individually or collectively assume any number of states. More specifically, the processors 112 may operate as finite-state machines, in response to executable instructions contained within the software modules stored on the media 116. These computer-executable instructions may transform the processors 112 by specifying how the processors 112 transition between states, thereby physically transforming the transistors or other discrete hardware elements constituting the processors 112.

Encoding the software modules for managing SSL fixtures over PLC networks may also transform the physical structure of the storage media 116. The specific transformation of physical structure may depend on various factors, in different implementations of this description. Examples of such factors may include, but are not limited to: the technology used to implement the storage media 116, whether the storage media 116 are characterized as primary or secondary storage, and the like. For example, if the storage media 116 are implemented as semiconductor-based memory, the software for managing SSL fixtures over PLC networks may transform the physical state of the semiconductor memory, when the software is encoded therein. For example, the software may transform the state of transistors, capacitors, or other discrete circuit elements constituting the semiconductor memory.

As another example, the storage media 116 may be implemented using magnetic or optical technology. In such implementations, the software for managing SSL fixtures over PLC networks may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The local controllers 102 may also include PLC modems 118, which are coupled to communicate with other components of the local controllers 102 through the bus systems 114. More specifically, the PLC modems 118 may serve as interfaces between the bus systems 114 of the local controllers 102 and the power distribution network 108. In example implementations, the local controllers 102 may be deployed within buildings as part of the residential installation 104 or the industrial/commercial installation 106.

One or more of the local controllers 102, and the PLC modems 118 provided thereby, may overlay a power line carrier (PLC) network 120 onto the power distribution networks 108 of a given installation 104 or 106. More specifically, the PLC modem 118 may transmit and receive control signal/feedback 110*a* to and from the PLC network 120. In turn, the PLC network 120 may transmit these control signals/feedback to or from any number of solid-state luminary (SSL) lighting nodes 122*a* and 122*n* (collectively, SSL lighting nodes 122). Examples of SSL lighting devices may include, but are not limited to, technologies such as light-emitting diodes (LEDs), light-emitting capacitors (LECs), light-emitting transistors (LETs), and the like.

The PLC network 120 may include a communication bridge operative to enable communications with other computing devices via Ethernet, wireless, infrared, and the like. Wireless communications may include radio-frequency (RF) capabilities, or the like. This communications bridge may enable communications over trouble areas in the PLC network 120, by employing supplemental wired or wireless communications techniques to circumvent such trouble areas.

The control signals routed to the SSL lighting nodes 122 can command the lighting nodes to illuminate or turn off, and may also command the SSL lighting nodes 122 to perform color mixing, to output particular colors of light. For example, the SSL lighting nodes 122 may include SSL elements having red-green-blue (RGB) color output capabilities, and the control signals may specify particular RGB values for particular lighting nodes. It is noted that white light may be specified in terms of RGB values. Put differently, white light may be specified as "colored" light. In addition, the color mixing functions described herein may be performed with any suitable modulation schemes, including but not limited to the modulation schemes described herein.

FIG. 1 illustrates at 124*a* control signals/feedback transmitted to or from the SSL lighting node 122*a*, and illustrates at 124*n* control signals/feedback transmitted to or from the SSL lighting node 122*n*.

This description provides examples of sending SSL control signals over the PLC networks 120, which may be deployed over the power distribution networks 108 within the installations 104 and 106. However, some implementations of this description may also deploy at least parts of the PLC networks 120 over an external power grid that supplies power to the installations 104 and 106. Put differently, the SSL control signals may travel on the external power grids or internal power distribution networks.

Figure 2:
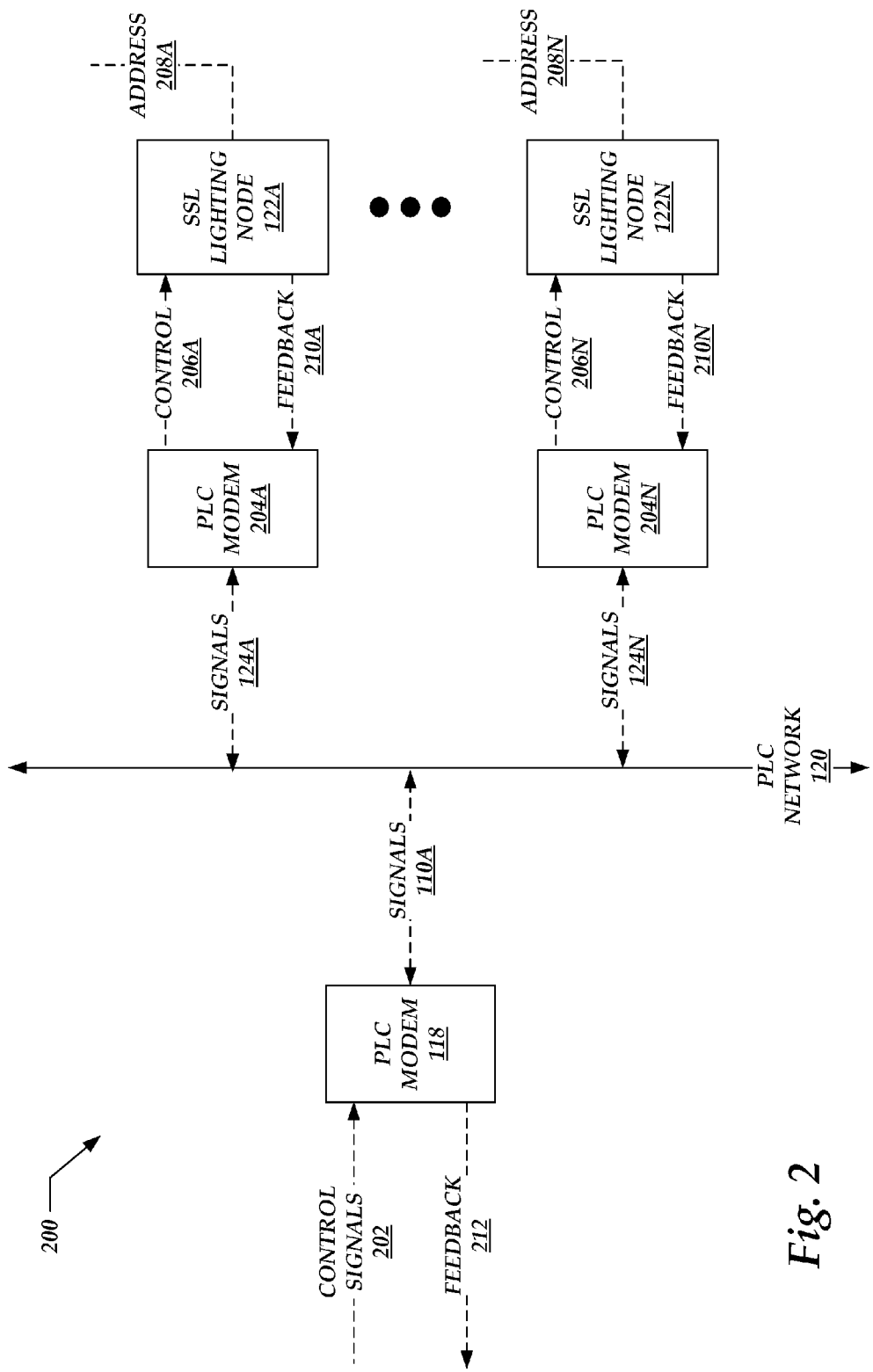
FIG. 2 is a combined block and flow diagram illustrating example signal flows transmitted over the PLC networks between a PLC modem associated with a local controller and PLC modems associated with different SSL lighting nodes.

FIG. 2 illustrates example components and signal flows, denoted generally at 200, involved with transmitting control and/or feedback signals over the PLC networks 120. More specifically, the PLC modem 118 may receive control signals 202, and transmit these signals to the SSL lighting nodes 122 over the PLC network 120. In turn, PLC modems 204a and 204n (collectively, PLC modems 204) are associated respectively with the SSL lighting nodes 122a and 122n. The PLC modem 204a may monitor the PLC network 120 for any control signals that are addressed to the SSL lighting node 122a. When control signals addressed to the SSL lighting node 122a appear on the PLC network 120, the PLC modem 204 may extract these signals, decode them as appropriate, and route them to the SSL lighting node 122a for processing, as represented at 206a.

The PLC modems 118 and 204 may operate with PLC networks 120 overlaid onto circuits 108 having any of the electrical characteristics described above. In addition, the PLC modems 118 and 204 may provide phase-coupling functions, in which the modems 118 and 204 may transfer signals from one phase to another. For example, the 118 and 204 may couple single-phase circuits to poly-phase circuits, or may couple different phases in a poly-phase circuit to communicate with one another.

The PLC modems 118 and 204 may communicate with one another over the PLC network 120 using any suitable modulation techniques. Examples of such modulation techniques may include, but are not limited to, differential code shift keying (DCSK), adaptive code shift keying (ACSK), frequency shift keying (FSK), orthogonal frequency-division multiplexing (OFDM), and the like.

Similarly, the PLC modem 204n may monitor the PLC network 120 for any control signals directed to the SSL lighting node 122n. FIG. 2 provides examples of these control signals at 206n.

As shown in FIG. 2, the SSL lighting nodes 122a and 122n may be associated with respective addresses 208a and 208n (collectively, addresses 208), as defined in the context of the PLC network 120. These addresses 208 may enable the PLC modems 204 to identify control signals that are directed to particular SSL lighting nodes 122.

It is noted that the addresses 208 can represent static addresses or dynamic addresses, and that the SSL lighting nodes 122 may implement static or dynamic addressing schemes. Examples of static addressing schemes include scenarios in which a given SSL lighting node 122 is assigned and configured to respond to a given network address more or less permanently. Examples of dynamic addressing schemes include scenarios in which a given SSL lighting node 122 is assigned and configured to respond to different network addresses at different times.

In addition to receiving the control signals 206a and 206n (collectively, control signals 206) from the PLC network 120, the SSL lighting nodes 122 may also generate feedback information, and transmit this feedback over the PLC network 120 for processing by the local controller 102. FIG. 2 provides examples of feedback information 210a originating at the SSL lighting node 122a and of feedback information 210n originating at the SSL lighting node 122n. In turn, the PLC modems 204a and 204n may respectively encode the feedback information 210a and 210n for transmission over the PLC network 120.

The PLC modems 204 may also operate to provide a degree of segmentation in an otherwise un-segmented PLC network 120. More specifically, the feedback 210 from particular lighting nodes 122 may include notifications of status changes occurring locally at the lighting node 122 (e.g., lights turned on/off, current occupancy status, etc.). However, the PLC network 120 can be a low-bandwidth network, so if numerous lighting nodes 122 report each local status update, the PLC network 120 may become overwhelmed. In addition, some status updates may be specious, and not worth reporting over the PLC network 120. Accordingly, the PLC modems 204 may provide a filtering function, such that they do not report each instance of feedback or status updates, but may report some subset of such updates.

The PLC modems 204 may thus provide a degree of segmentation within the larger PLC network 120. Put differently, the PLC modems 204 may implement sub-networks around the lighting nodes 122 to which the PLC modems 204 are coupled.

In light of the foregoing description, it is understood from FIG. 2 that the signals 124a collectively represent the control signals 206a and the feedback signals 210a. Similarly, the signals 124n collectively represent the control signals 206n and the feedback signals 210n. FIG. 2 denotes at 212 examples of node feedback as sent over the PLC network 120 and received by the PLC modem 118.

Figure 3:
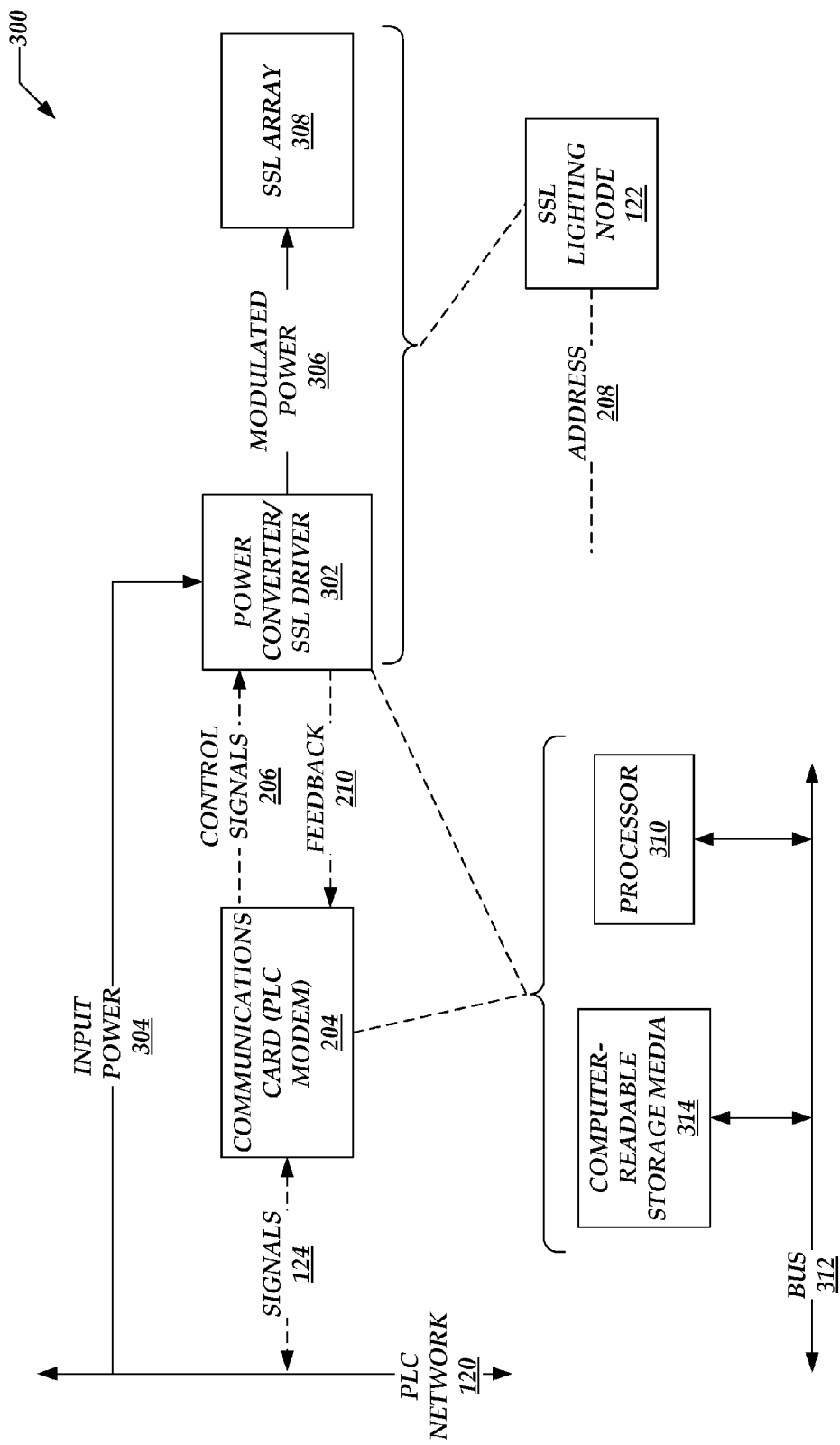
FIG. 3 is a combined block and flow diagram illustrating example components included within the SSL lighting nodes.

FIG. 3 illustrates example components, denoted generally at 300, that may be included within the SSL lighting nodes. FIG. 3 carries forward a representative SSL lighting node 122 from FIG. 2, as associated with a corresponding representative address 208. In addition, FIG. 3 carries forward an example PLC modem 204, operating as a communications card on behalf of the SSL lighting node 122.

In general, the SSL lighting nodes 122 are understood as physical manifestations of addressable end points on the PLC network 120. More specifically, the local controllers 102 may configure or control operations of the SSL lighting nodes 122 over the PLC network 120, by addressing control signals 206 to those SSL lighting nodes 122.

As shown in FIG. 3, the SSL lighting nodes 122 may include a power converter 302 that receives input power 304 available over the power distribution network 108 (FIG. 1). The nature and type of the input power 304 may vary in different implementations, depending upon the characteristics of the power distributed over the power distribution network 108. As discussed above in the description of the power distribution network 108, the input power 304 may be characterized as single-phase, poly-phase, or otherwise. In addition, the input power 304 may be AC power or DC power, supplied at a variety of different possible voltage levels.

The power converter 302 may receive the control signals 206, as transmitted over the PLC network 120 and decoded by the PLC modem 204. In response to the control signals 206, the power converter 302 may modulate the input power 304 as specified by the control signals 206. FIG. 3 denotes at 306 the output of the power converter 302.

The SSL lighting node 122 may include one or more SSL arrays 308, with FIG. 3 illustrating a single SSL array 308 only for convenience of illustration. In general, the SSL arrays 308 may include any number of discrete SSL elements, arranged and packaged as appropriate for particular implementations. For example only, and without limiting possible implementations of this description, the SSL arrays 308 may be configured to illuminate rooms or spaces within residential or commercial buildings. In some cases, the SSL arrays 308 may be included within SSL fixtures that are retrofitted into existing buildings to achieve energy savings. In other cases, these SSL fixtures may be installed in new buildings.

The SSL arrays 308 may be characterized as digital devices, operable in response to the output 306 of the power converter 302 to provide a level of lighting or illumination as specified by the control signals 206. In example implementations, the power converter 302 may employ any number of different schemes to modulate the input power 304 as specified by the control signals 206, thereby resulting in a modulated output power 306 supplied to the SSL arrays 308. For example, the power converter 302 may employ pulse-width modulation (PWM), pulse-shape modulation (PSM), pulse-code modulation (PCM), bit-angle modulation (BAM), parallel pulse code modulation (PPCM), or other modulation techniques, whether known or developed in the future.

In general, the illumination output of the SSL arrays 308 is responsive to the duty cycle of the modulated power 306 supplied to the SSL arrays 308. Typically, if the control signals 206 specify to brighten the SSL arrays 308, the duty cycle of the modulated power 306 may increase correspondingly. Conversely, if the control signals 206 specify to dim or shut off the SSL arrays 308, the duty cycle of the modulated power 306 may decrease accordingly. In general, the power converter 302 may also operate as an SSL driver, configured and operating as appropriate to drive the SSL array 308 at a specified level of illumination.

The PLC modem 204 and the power converter 302 may include any suitable combination of hardware and/or software configured as appropriate to achieve the functions described herein. FIG. 3 illustrates the PLC modem 204 and the power converter 302 as separate components only to facilitate the present description, but not to limit possible implementations of this description. For example, some implementations of this description may combine the functions allocated to the PLC modem 204 and the power converter 302 into an integrated hardware solution (e.g., a single integrated chip (IC)). However, other implementations of this description may provide a multi-chip solution that includes separate hardware implementing the PLC modem 204 and the power converter 302.

Regarding the PLC modems 118 as shown in FIG. 1, the PLC modems 204 as shown in FIGS. 2 and 3, the power converters 302 as shown in FIG. 3, and the processors 112 (FIG. 1) and 310 (FIG. 3), any of these components may be realized as single chips or multiple chips. Put differently, the representations of these various components as presented in the drawing Figures herein do not limit implementations of these components to single-chip scenarios.

In the examples shown in FIG. 3, the PLC modem 204 and/or the power converter 302 may include one or more instances of processing hardware 310, bus systems 312, and computer-readable storage media 314. Recalling previous description of FIG. 1, the local controller 102 may include the processor hardware 112, bus systems 114, and computer-readable storage media 116. In general, the foregoing description of these elements as provided with FIG. 1 applies equally to the processing hardware 310, bus systems 312, and computer-readable storage media 314 as shown in FIG. 3. For example, to the extent that the PLC modem 204 and/or the power converter 302 include software components, the software components may reside within the computer-readable storage media 314, and be loaded into the processor hardware 310 over the bus systems 312. In turn, the processing hardware 310 may execute the software, thereby transforming the processing hardware 310 to perform various functions located herein to the PLC modem 204 and/or the power converter 302.

Figure 4:
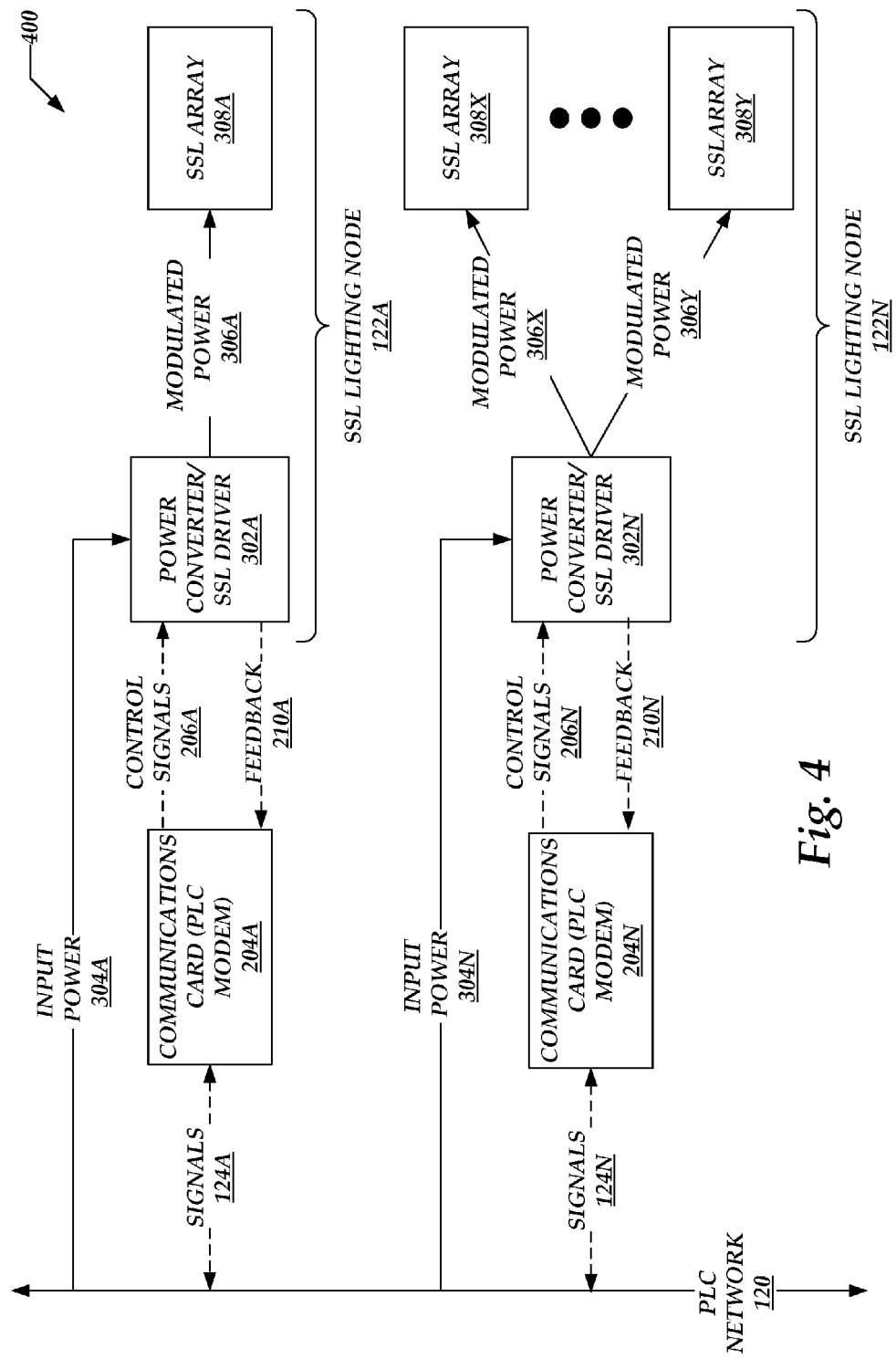
FIG. 4 is a combined block and flow diagram illustrating how SSL lighting nodes may control multiple SSL arrays.

FIG. 4 provides components and signal flows, denoted generally at 400, illustrating how SSL lighting nodes may control a single SSL array or multiple SSL arrays in different possible implementations scenarios. For example, the PLC modem 204a may receive overall signal flows 124a from the PLC network 120. In turn, the PLC modem 204a may generate the control signals 206a, suitable for configuring the power converter 302a to modulate the input power 304a to drive the SSL array 308a at a given illumination level, as specified by the control signals 206a. In the example shown in FIG. 4, the SSL lighting node 122a may include the power converter 302a and a single SSL array 308a. Accordingly, the local controller 102 shown in FIG. 1 may address the SSL lighting node 122a to control the single SSL array 308a.

In another example shown in FIG. 4, the SSL lighting node 122n includes the power converter 302n, which is coupled to drive a plurality of SSL arrays 308x and 308y. More specifically, the PLC modem 204n may receive the overall signals 124n from the PLC network 120, and generate the control signals 206n for configuring the power converter 302n. In turn, the power converter 302n may modulate the input power 304n to drive the multiple SSL arrays 308x and 308y in response to the control signals 206n. Accordingly, the local controller 102 (FIG. 1) may address the SSL lighting node 122n to control multiple SSL arrays 308x and 308y.

Turning to the multiple SSL arrays 308x and 308y in more detail, these multiple SSL arrays 308x and 308y may both be coupled to the power converter 302n using one or more suitable low-voltage busses or cables. For clarity of illustration, FIG. 4 omits representations of these busses or cables.

In example implementations, the multiple SSL arrays 308x and 308y may represent multiple SSL fixtures installed in a given room, hallway, or other area that are commonly controlled or managed. These multiple SSL arrays 308x and 308y may or may not be supplied by the same branch circuit.

In some implementations, a given PLC modem 204a or 204n may be coupled to communicate with and control multiple lighting nodes 122. Accordingly, the examples shown in FIG. 4 are understood as non-limiting. For example, the PLC modem 204a or 204n may be coupled to one or more power converters (e.g., 302a or 302n), which in turn may couple to one or more arrays 308.

Figure 5:
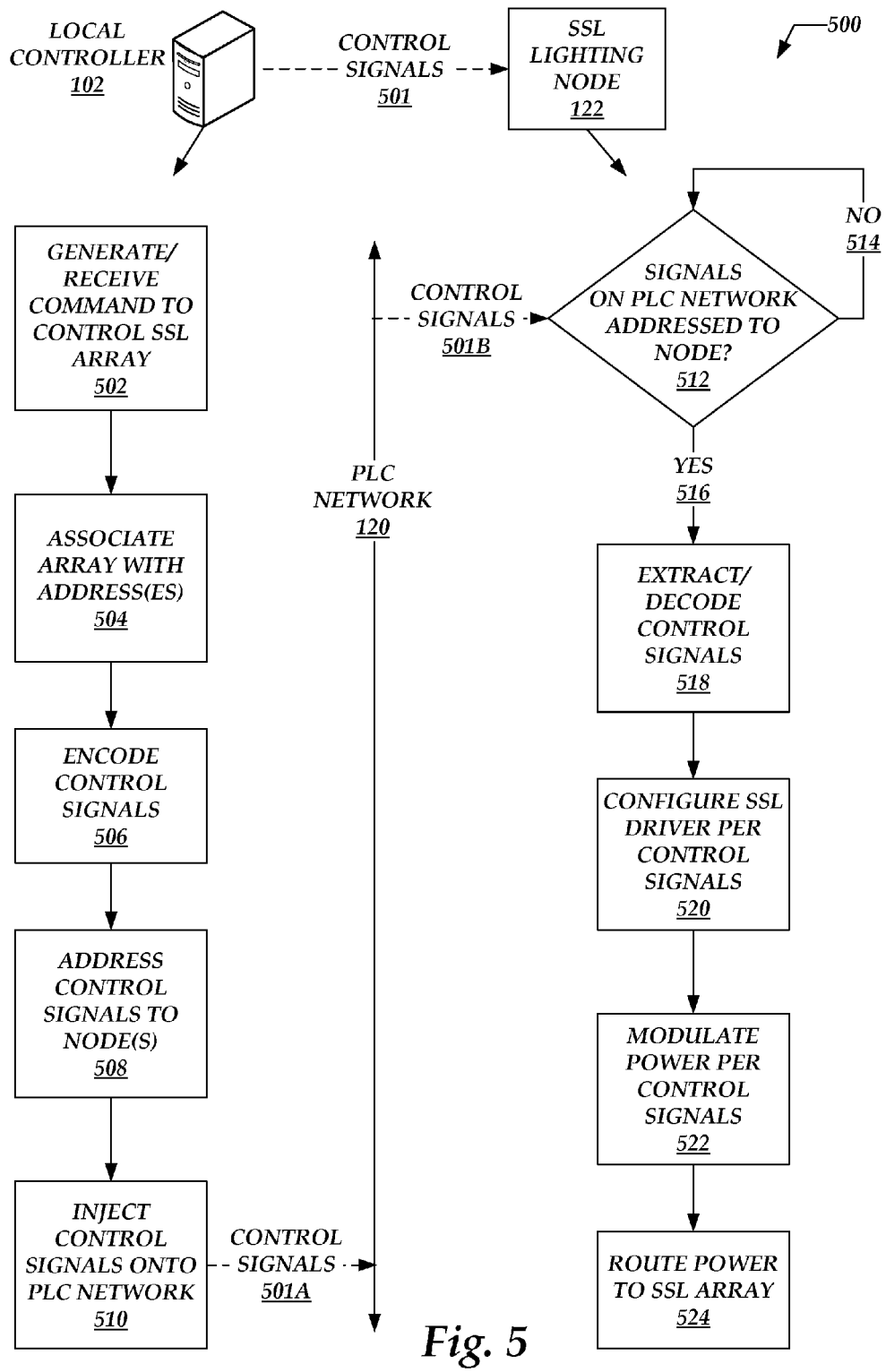
FIG. 5 is a flow chart illustrating processes for routing control signals to the SSL lighting nodes.

FIG. 5 illustrates process flows, denoted generally at 500, for routing control signals to the SSL lighting nodes. To facilitate discussion of the process flows 500, but not to limit possible implementations of this description, FIG. 5 carries forward an example local controller 102 and an example SSL lighting node 122. FIG. 5 illustrates example control signals 501 passing from the local controller 102 to the SSL lighting node 122 over the PLC network 120. The control signals 501 are understood to be a subset of the control/feedback signals 110 shown in FIG. 1.

Turning to the process flows 500 in more detail, block 502 represents generating or receiving one or more commands to control one or more SSL arrays. Examples of such commands may include commands to dim one or more of given SSL arrays, commands to turn off the given SSL arrays entirely, commands to specify a particular illumination level for the given SSL arrays, and the like.

Block 504 represents associating the given SSL arrays with addresses of SSL lighting nodes with which those fixtures are associated. For example, FIG. 2 above illustrates examples of such addresses at 208a and 208n, as associated respectively with the SSL lighting nodes 122a and 122n. In addition, as illustrated in FIG. 4 a given SSL lighting node 122 may be associated with any number of SSL arrays 308. Accordingly, if block 502 includes receiving a command to dim a set of SSL arrays installed along a given hallway, block 504 may include identifying one or more SSL lighting nodes that controls this set of SSL arrays. The association between particular SSL arrays 308 and SSL lighting nodes 122 may be established or predefined as part of the design of the lighting systems for a particular installation.

Block 506 represents encoding control signals corresponding to the command received or generated in block 502. For example, block 506 may include encoding these control signals for transmission over the PLC network 120. The particular encoding performed in block 506 may depend upon the protocols employed or supported by the PLC modem (e.g., 118 in FIG. 1).

Block 508 represents addressing control signals to the SSL lighting nodes 122 that are associated with the SSL arrays 308 to be controlled. For example, block 502 may include receiving commands that specify illumination levels for multiple different SSL arrays 308. These multiple SSL arrays 308 may or may not be associated with or controlled through the same SSL lighting nodes 122. Accordingly, block 508 may include addressing control signals to one or more SSL lighting nodes 122.

Block 510 represents injecting the encoded control signals onto the PLC network 120. FIG. 5 denotes at 501*a* the control signals as injected by the local controller 102 onto the PLC network 120. As noted above, control signals may be addressed or directed to one or more SSL lighting nodes 122, depending upon the circumstances of a particular installation.

FIG. 5 denotes at 501*b* the control signals as analyzed by a given SSL lighting node 122. At the given SSL lighting node 122, decision block 512 represents evaluating whether signals on the PLC network 120 are addressed to that given SSL lighting node 122. From decision block 512, if the control signals 501*b* are not addressed to the given SSL lighting node 122, the process flows 500 may take No branch 514 to loop at block 512. More specifically, the process flows 500 may remain at block 512 until control signals 501*b* on the PLC network 120 are addressed to the given SSL lighting node 122. Once such control signals 501*b* appear on the PLC network 120, the process flows 500 may take Yes branch 516 to block 518.

Block 518 represents extracting and decoding the control signals that are addressed to the given SSL lighting node 122. The type and nature of the decoding performed in block 518 may depend upon the protocols supported by the PLC modems 204 shown in FIG. 2.

Block 520 represents configuring a power converter or SSL driver (e.g., 302 in FIG. 3) in response to the control signals decoded in block 518. As described above, a given SSL lighting node may be configured to drive any number of SSL arrays.

Block 522 represents modulating power driven to one or more SSL arrays, to achieve an illumination level specified by the control signals decoded in block 518. FIG. 3 provides examples of unmodulated input power at 304, and provides examples of modulated power at 306.

Block 524 represents routing or directing the modulated power to one or more SSL arrays associated with the given SSL lighting node 122. Put differently, block 524 may include illuminating the SSL arrays at the level specified by the control signals generated by the local controller 102 in block 502.

Figure 6:
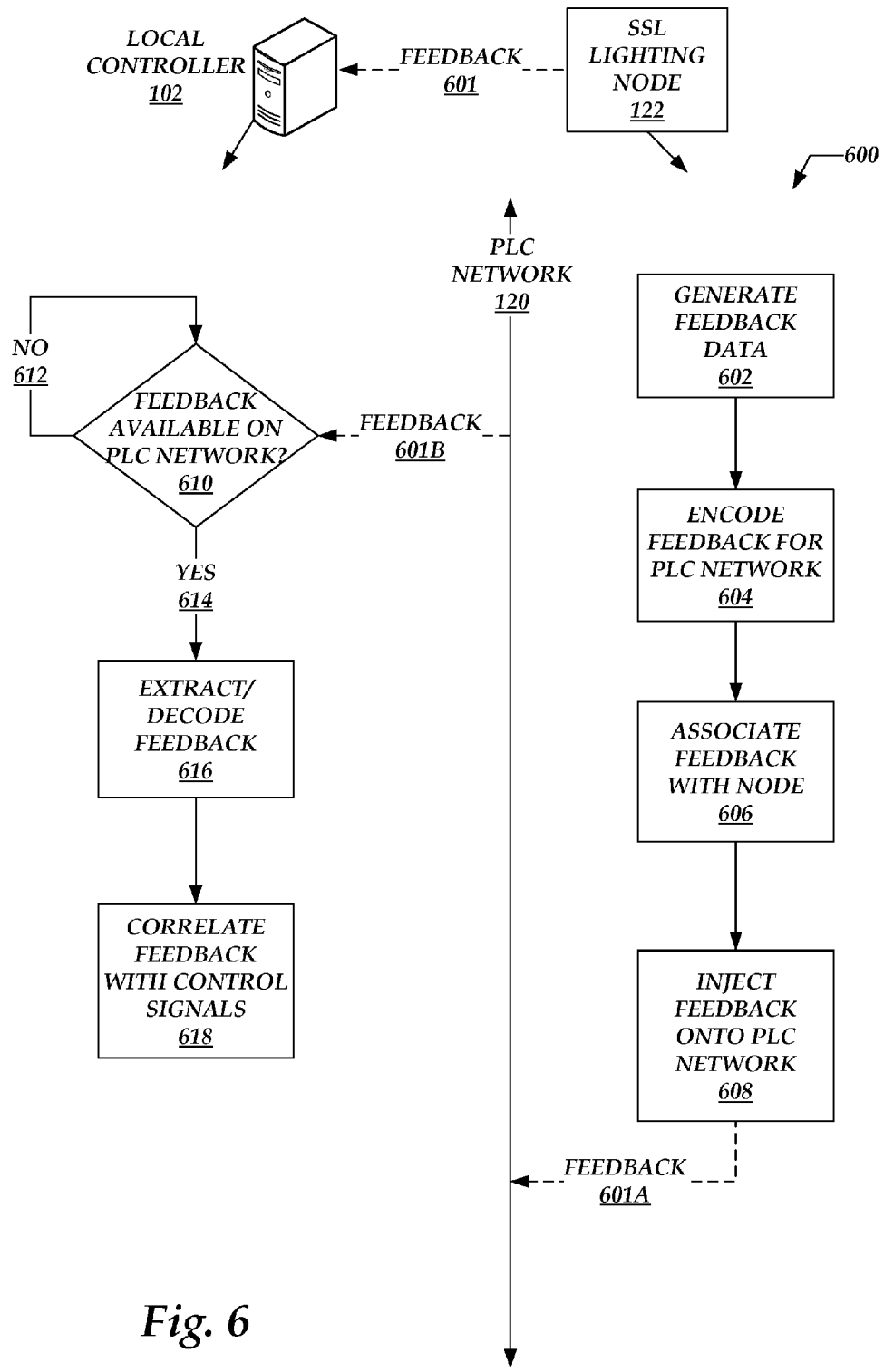
FIG. 6 is a flow chart illustrating processes for routing feedback information from the SSL lighting nodes.

FIG. 6 illustrates process flows, denoted generally at 600, for routing feedback information 601 from SSL lighting nodes 122 to local controllers 102. Without limiting possible implementations of this description, the feedback information 601 may be understood to be a subset of the control/feedback signals 110 shown in FIG. 1.

At the SSL lighting node 122, block 602 represents generating feedback data for transmission over the PLC network 120 one or more local controllers 102. Examples of this feedback data may include electrical load status experienced by the SSL lighting node 122 at a given time. Feedback data may also reflect temperature status of the SSL lighting node 122, general operational status, status of response to particular commands or control signals, and the like. In some cases, sensors associated with the SSL lighting nodes 122 may detect this feedback data. These sensors may be configured to detect and report on any number of local conditions affecting different given SSL lighting nodes 122.

Block 604 represents encoding the feedback data for transmission over the PLC network 120. For example, block 604 may include encoding the feedback data in accordance with protocols supported by the PLC modem (e.g., 204 in FIG. 2) associated with the SSL lighting node 122.

Block 606 represents associating the feedback data with an address corresponding to the SSL lighting node 122. In example implementations, block 606 may include loading this address information into a header structure. In this manner, when the encoded feedback data arrives at the local controller 102, the local controller may determine which SSL lighting node 122 communicated the feedback data.

Block 608 represents injecting the encoded feedback data onto the PLC network 120. FIG. 6 denotes at 601*a* examples of the feedback data as injected onto the PLC network 120.

Referring to the local controller 102, decision block 610 represents evaluating whether feedback data is available on the PLC network 120. FIG. 6 denotes at 601*b* feedback information as received by the local controller 102 from the PLC network 120.

From decision block 610, so long as feedback information 601*b* is not available on the PLC network 120, the process flows 600 may take No branch 612 and loop at decision block 610. However, from decision block 610, once feedback information 601*b* is available on the PLC network 120, the process flows 600 may take Yes branch 614 to block 616.

Block 616 represents extracting and decoding the feedback data 601*b*. For example, the PLC modem 118 provided by the local controller 102 may decoded the feedback data 601*b*.

In some implementations of this description, block 618 represents correlating the feedback 601 with at least one instance of control signals previously sent to the SSL lighting node 122. For example, the SSL lighting node 122 may generate and transmit some instances of the feedback 601 in response to explicit control signals or requests transmitted by the local controller 102. In other cases, the SSL lighting node 122 may generate and transmit feedback 601 relatively spontaneously, on an event-driven basis. In these latter scenarios, the feedback 601 may be separate of and independent from any previous control signals sent by the local controller 102.

Without limiting possible implementations, at least portions of the process flows 500 and 600 may be performed by software contained within suitable computer-readable storage media provided by the local controller 102 and/or the SSL lighting node 122. FIG. 1 provides examples of computer-readable storage media 116 contained within the local controllers 102, and FIG. 3 provides examples of computer readable storage media 314 as associated with the SSL lighting nodes 122.

Figure 7:
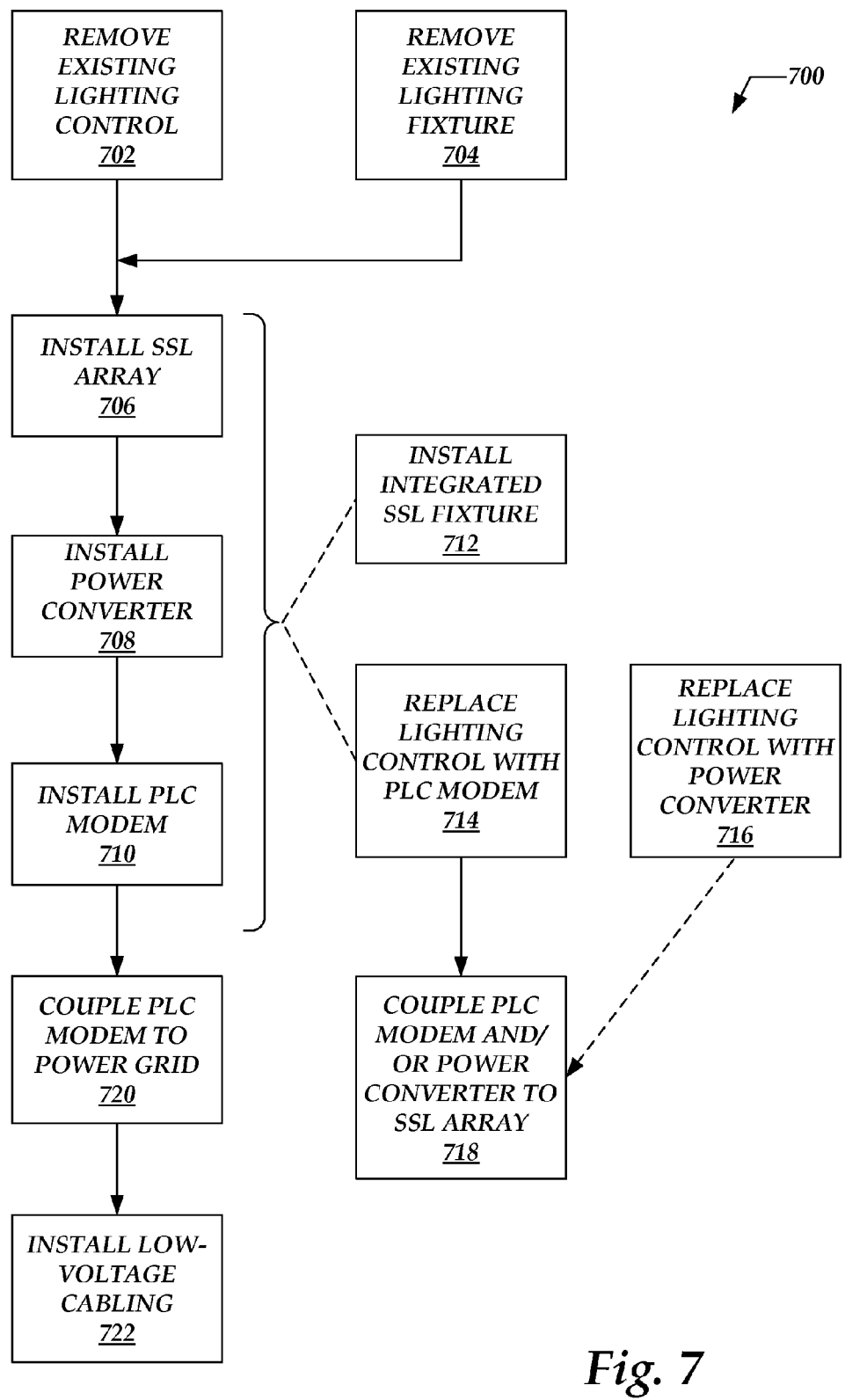
FIG. 7 is a flow chart illustrating processes for installing or retrofitting SSL arrays, SSL drivers, and/or PLC modems into building installations.

FIG. 7 illustrates processes, denoted generally at 700, for installing or retrofitting SSL arrays, SSL drivers, and/or PLC modems into building installations. For example, in some implementations, the processes 700 may involve installing the SSL arrays, SSL drivers, and/or PLC modems into new building construction or renovations, where no lighting fixtures existed previously. In other implementations, the processes 700 may involve replacing existing lighting fixtures with the SSL arrays, SSL drivers, and/or PLC modems.

Turning to the processes 700 in more detail, block 702 represents removing one or more existing lighting control devices. Examples of these lighting control devices may include switches or switchgear, which may be mounted into walls or other convenient locations within buildings. Block 704 represents removing one or more existing lighting fixtures, for example, in instances in which the process flows 700 are performed to replace the existing lighting fixtures with SSL fixtures. However, it is noted that blocks 702 and 704 may be performed in any relationship, relative to one another. In addition, it is noted that all instances of the process flows may or may not perform blocks 702 and 704.

Block 706 represents installing one or more SSL arrays (e.g., 308 in FIG. 3). Block 708 represents installing one or more power converter components (e.g., 302 in FIG. 3). As described above, the power converter components may operate as SSL drivers, driving control signals to the SSL arrays to generate a prescribed level of illumination. Block 710 represents installing one or more PLC modems (e.g., 204 in FIGS. 2 and 3).

Elaborating on blocks 706-710 in more detail, block 712 represents installing one or more integrated SSL fixtures that include at least one instance of the SSL array, the power converter, and the PLC modem. Examples of these integrated SSL fixtures may include all of the foregoing components in a given package, for installation as an integrated unit.

Block 714 represents replacing at least one instance of a lighting control with the PLC modem. For example, block 714 may include physically replacing a switch mounted in a wall box with the PLC modem.

Block 716 represents replacing at least one instance of the lighting control with the power converter. For example, block 716 may include physically replacing the wall-mounted switch with the power converter.

Replacing the lighting controls with PLC modems and related communications devices, as described herein, enables more granular control of the lighting nodes, particularly as compared to on-off wall switches. For example, the PLC modems may be addressed and controlled individually over the PLC network, and the SSL arrays associated with these PLC modems may be driven to any specified degree of illumination, whether considered in terms of brightness, color mixing, or other factors.

As described above, in some implementations of this description, the PLC modem may be integrated with the power converter in a one-chip solution. In such scenarios, either block 714 or block 716 may represent replacing the lighting control with this one-chip solution.

Generally, in implementations in which switching components are replaced with the PLC modem and/or power converter, the SSL arrays may be physically separated from the PLC modem and/or power converter. For example, the PLC modem and/or power converter may be mounted in a wall location, while the SSL arrays are mounted in a ceiling location. Accordingly, block 718 represents coupling the PLC modem and/or at the power converter to the SSL arrays. For example, block 718 may include installing a low-voltage cable coupling the SSL arrays to the PLC modem and/or power converter.

Block 720 represents coupling the PLC modem to communicate with the power distribution network (e.g., 108 in FIG. 1) that distributes electrical power within a given installation. In retrofit scenarios, block 720 may include coupling power cables, which formerly supplied lighting controls and/or lighting fixtures, to the PLC modem. In new installations, block 720 may include coupling newly-installed power cables to the PLC modem.

As described above, a given SSL lighting node may control one or more SSL arrays. In implementation scenarios in which multiple SSL arrays are controlled using a single SSL lighting node (e.g., a power converter), block 722 represents installing any low-voltage cabling coupling the multiple SSL arrays with the single SSL lighting node.

The foregoing description provides technologies for managing SSL fixtures over PLC networks. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. A power line carrier network system for controlling a solid-state luminary fixture using a power distribution network that distributes electrical power, comprising:
   a local controller comprising
      a processor configured to receive and process a control signal to control the solid-state luminary (SSL) fixture,
   an SSL lighting node comprising
      a power converter to receive input power from a PLC network, and
      receive the control signal to control a power convertor to modulate the input power to provide a level of illumination specified by the control signal,
   a power line carrier (PLC) modem coupled to the PLC network configured to
      extract the control signal from the PLC network;
      decode the control signal;
      route the control signal to an SSL lighting node interfaced with the PLC network;
      receive feedback from the power converter;
      encode the feedback for transmission on the PLC network; and
      inject the feedback onto the PLC network.

2. The system of claim 1, wherein the input power is modulated to increase an illumination level of the SSL lighting node in response to the control signal.

3. The system of claim 1, wherein the input power is modulated to decrease an illumination level of the SSL lighting node in response to the control signal.

4. The system of claim 1, wherein the power convertor is configured to provide feedback that represents: an electrical load demanded by the SSL lighting node, a temperature status associated with the SSL lighting node, an operational status of the SSL lighting node, or a response to the control signal received over the PLC network.

5. The system of claim 1, wherein the PLC modem is configured to receive the feedback on an event-driven basis.

6. The system of claim 1, further comprising a second SSL lighting node coupled to the PLC modem.

7. A method for controlling a solid-state luminary fixture using a power distribution network that distributes electrical power, the method comprising:

receiving and processing control signals from a PLC network to control the solid-state luminary (SSL) fixture;

extracting the control signals;

decoding the control signals;

routing the control signals to an SSL lighting node interfaced with the PLC network;

receiving the control signals to control a power convertor to modulate input power to provide a level of illumination specified by the control signals;

receiving feedback from the power converter;

encoding the feedback for transmission on the PLC network; and injecting the feedback onto the PLC network.

8. The method of claim 7, wherein the input power is modulated to increase an illumination level of the SSL lighting node in response to the control signal.

9. The method of claim 7, wherein the input power is modulated to decrease an illumination level of the SSL lighting node in response to the control signal.

10. The method of claim 7, wherein the feedback represents: an electrical load demanded by the SSL lighting node; a temperature status associated with the SSL lighting node; an operational status of the SSL lighting node; or a response to the control signals received over the PLC network.

11. A computer storage medium having computer readable instructions stored thereupon that, when executed by a computer, cause the computer to:

receive and process control signals from a PLC network to control a solid-state luminary (SSL) fixture;

extract the control signals;

decode the control signals;

route the control signals to an SSL lighting node interfaced with the PLC network;

receive the control signals to control a power convertor to modulate input power to provide a level of illumination specified by the control signals;

receive feedback from the power converter;

encode the feedback for transmission on the PLC network; and inject the feedback onto the PLC network.

12. The computer storage medium of claim 11, wherein the input power is modulated to increase an illumination level of the SSL lighting node in response to the control signal.

13. The computer storage medium of claim 11, wherein the input power is modulated to decrease an illumination level of the SSL lighting node in response to the control signal.

14. The computer storage medium of claim 11, wherein the feedback represents: an electrical load demanded by the SSL lighting node; a temperature status associated with the SSL lighting node; an operational status of the SSL lighting node; or a response to the control signal received over the PLC network.

* * * * *